United States Patent
Van Blokland

(10) Patent No.: US 10,085,455 B2
(45) Date of Patent: Oct. 2, 2018

(54) DEVICE AND METHOD FOR PRESSING A DOUGH PART

(71) Applicant: Radie B.V., Culemborg (NL)

(72) Inventor: Johannes Josephus Antonius Van Blokland, Laren (NL)

(73) Assignee: Radie B.V., Culemborg (NL)

( * ) Notice: Subject to any disclaimer, the term of this patent is extended or adjusted under 35 U.S.C. 154(b) by 79 days.

(21) Appl. No.: 14/709,979

(22) Filed: May 12, 2015

(65) Prior Publication Data

US 2015/0327559 A1   Nov. 19, 2015

(30) Foreign Application Priority Data

May 13, 2014   (EP) ..................... 14168183

(51) Int. Cl.

| A21C 11/08 | (2006.01) |
|---|---|
| A21C 11/00 | (2006.01) |
| A21C 5/00 | (2006.01) |
| A21C 3/02 | (2006.01) |
| A21C 3/06 | (2006.01) |
| A21C 9/08 | (2006.01) |
| A21C 11/04 | (2006.01) |

(52) U.S. Cl.
CPC .............. *A21C 11/00* (2013.01); *A21C 3/028* (2013.01); *A21C 3/06* (2013.01); *A21C 5/003* (2013.01); *A21C 9/088* (2013.01); *A21C 11/004* (2013.01); *A21C 11/04* (2013.01); *A21C 11/08* (2013.01)

(58) Field of Classification Search
CPC ....... A21C 11/08; A21C 11/04; A21C 11/004; A21C 11/00; A21C 3/028; A21C 3/06; A21C 5/003; A21C 9/088

USPC .................................. 425/373, 280
See application file for complete search history.

(56) References Cited

U.S. PATENT DOCUMENTS

| 2,614,511 A | * | 10/1952 | Neutelings | A21C 11/04 425/299 |
|---|---|---|---|---|
| 3,417,713 A | * | 12/1968 | Schwebel | A21C 11/04 425/102 |
| 3,590,748 A | * | 7/1971 | Palmer | A21O 5/00 425/156 |
| 3,635,638 A | * | 1/1972 | Bryan | A21C 11/08 198/463.4 |
| 3,880,030 A | * | 4/1975 | Rosengren | A21C 11/04 425/291 |
| 4,582,472 A | | 4/1986 | Hanson | |
| 5,024,719 A | * | 6/1991 | Heck | A21C 11/00 101/8 |

(Continued)

FOREIGN PATENT DOCUMENTS

| EP | 0490190 A1 | 6/1992 |
|---|---|---|
| EP | 1709872 A2 | 10/2006 |

(Continued)

*Primary Examiner* — Seyed Masoud Malekzadeh
(74) *Attorney, Agent, or Firm* — The Webb Law Firm

(57) ABSTRACT

The present invention relates to a method and device for pressing at least one dough part, such as a croissant, comprising a conveyor, for conveying dough parts in a direction of movement; at least one press stamp, arranged movable with at least a component in a direction towards a surface of the conveyor for pressing the dough part and wherein the press stamp is further arranged movable with at least a component in the direction of movement of the dough part.

14 Claims, 5 Drawing Sheets

(56) References Cited

U.S. PATENT DOCUMENTS

| | | | | |
|---|---|---|---|---|
| 5,162,119 | A | * | 11/1992 | Pappas ............... A21C 9/04 |
| | | | | 101/106 |
| 7,178,456 | B1 | * | 2/2007 | Bryan ............... A21C 11/14 |
| | | | | 101/22 |
| 2003/0066433 | A1 | | 4/2003 | Rothamel et al. |
| 2006/0286244 | A1 | * | 12/2006 | Fu ............... A21C 11/04 |
| | | | | 426/549 |
| 2010/0159095 | A1 | * | 6/2010 | Suski ............... A21C 11/04 |
| | | | | 426/383 |
| 2010/0227024 | A1 | * | 9/2010 | Flores ............... A21C 11/04 |
| | | | | 426/87 |
| 2011/0097467 | A1 | | 4/2011 | Van Blokland |
| 2014/0370175 | A1 | * | 12/2014 | Bakhoum ............... A21C 11/08 |
| | | | | 426/503 |

FOREIGN PATENT DOCUMENTS

| | | | |
|---|---|---|---|
| EP | 2316270 | A1 | 5/2011 |
| EP | 2625958 | A2 | 8/2013 |
| WO | 2008133114 | A1 | 11/2008 |
| WO | 2011144191 | A1 | 11/2011 |

* cited by examiner

DEVICE AND METHOD FOR PRESSING A DOUGH PART

CROSS-REFERENCE TO RELATED APPLICATION

This application claims priority to European Patent Application No. 14168183.3 filed May 13, 2014, the disclosures of which are hereby incorporated in their entirety by reference.

BACKGROUND OF THE INVENTION

Field of the Invention

The present invention relates to a device and method for pressing a dough part.

Description of Related Art

Pressing, pinching, punching (or squeezing or clamping together of) dough parts commonly takes place in processes where dough parts should be adjacent or connected during at least a part of a preparation or baking process. In the process of baking croissants for example, the tips of the legs of a croissant are pinched in order to keep the croissant in its curved form, despite of a bias or tension in the dough that tends to straighten the dough product. During the baking, the tips of the legs may or may not separate or be separated again.

The benefit of a pressing or pinching operation as such is known per se. The European Patent EP 2 316 270 by the present applicant discloses a method and device for pinching dough parts, in particular tips of the legs of a croissant. This method has proven to be effective in many cases, but a need for further improvement is felt, in particular when it is not desired that the tips of the legs of a croissant separate. The international patent application WO 2011/144191 discloses a device for forming dough pieces comprising a shaft that pinches dough parts. However, the solution proposed in this document brings the risk of damaging the dough parts, either by leaving an undesired mark on them, or by smearing the dough over the conveyor band.

It is a goal of the present invention to provide a method and device for pressing a dough part that lacks the above disadvantages.

SUMMARY OF THE INVENTION

A first improvement to the state of the art would be to provide a shaft in a device for forming dough pieces with a roller, and to arrange and apply the roller at a location where the dough is moved. This way, the dough is pressed during conveyance, with a roller that is movable towards the conveyor. Such roller has the advantage that it is automatically turned by the dough so that its surface follows the dough surface, which leads to a reduced chance of damaging the dough parts and products.

The invention also proposes a device for pressing at least one dough part, such as a croissant, comprising a conveyor, for conveying dough parts in a direction of movement, at least one press stamp, arranged movable with at least a component in a direction towards a surface of the conveyor for pressing the dough part, wherein the press stamp is further arranged movable with at least a component in the direction of movement of the dough part.

By simultaneously moving the press stamp with a component in the direction of movement of the dough part while moving it towards the surface of the conveyor, the resulting relative movement with respect to the dough part is merely or even entirely pointed towards the conveyor. This leads to a (com)pressed dough part, but smearing or other damage as a result of mutual movement of the dough part and the press stamp in the direction of conveyance is avoided. It is to be noted that the pressing movement is directed towards the conveyor, but in general, the press stamp does not reach the conveyor surface, but leaves a predetermined gap, in order not to cut the dough piece. The size of the gap may be adjustable, and be set according to a specific dough product. The device according to the invention is in particular useful, and intended for pressing two (or more) parts of a dough piece against each other, so that they adhere during the further bakery process.

In order to automate the pressing of the dough, the device may comprise a sensor for providing a control signal upon sensing a presence of the dough parts, arranged upstream in the direction of conveyance with respect to the press stamp, as well as a controller, for driving the press stamp based on the control signal. Depending on the speed of the rotation and the distance between dough parts on the conveyor, the press stamp may be operated to move continuously, of to perform press actions and be halted in between.

In an embodiment, the press stamp is arranged rotary above the conveyor. Such rotary movement combines vertical and horizontal displacement. In particular, the controller may be configured for synchronising the speed of the press stamp in the direction of movement of the dough part with the speed of the conveyed dough part, at least during contact of the press stamp with the dough part.

In the most simple form, the speed of the surface of the press stamp is set equal to the horizontal speed of the conveyor. However, a more accurate and therefor preferred control algorithm adjusts the rotary speed of the press stamp in order to keep the horizontal component of the speed of the press stamp and the conveyor during dough contact equal. Thereto, the rotary speed of the press stamp needs to be increased while approaching the dough and while moving away from the dough.

Further improvement to the state of the art is obtained by shaping at least a part of the contact surface of the press stamp in a curved way, with a radius corresponding to the distance from its axis of rotation to the surface. That way, a constant compression and/or depression of the dough piece is obtained over the distance it is engaged by the press stamp.

This above mentioned distance is determined by the length of the press stamp, or the angle over which the radius corresponds to the distance from its axis of rotation to the surface. This angle may for instance extend between 20 and 60 degrees, and in particular between 35 and 50 degrees. A leading and lagging edge of the of the stamp part are rounded, with a smaller radius than the distance from its axis of rotation to the surface. In particular, the leading edge may have a larger radius than the lagging edge. The above mentioned distance may be between 20 and 60 mm, and in particular between 35 and 50 mm.

In a preferred embodiment, two or more press stamps are arranged about the same axis of rotation. No entire rotation of a press stamp is required with such configuration between two dough parts that need to be (com)pressed, so the device can be operated quicker and it has a better weigh balance, leading to lower oscillation and energy use.

Furthermore, multiple press stamps can be arranged next to each other, in a direction perpendicular to the direction of movement of the dough parts, to allow multiple lanes of dough parts to be pressed in parallel.

Since each lane may have its own sensor, and dough parts may not be exactly outlined, individual drives can be preferred. Also, the distance between the dough parts in the width of the conveyor and the amount of parallel lanes may vary. Therefore, the amount of press stamps and their mutual distance may be adjustable too, and press stamps next to each other may be configured to be nested, for instance by having mutually different orientations of drives and/or control units or mechanical parts.

Since dough lines may be used for the production of various products, it may be desired not to use the press stamps at certain times, and, when they are in use, the distance to the conveyor belt may also be subject to variation per product. Therefor, the height of the press stamp above the surface of the conveyor belt is adjustable.

As stated above a main purpose of the device according to the invention may be to (further) stick parts of a dough part together. This effect can further be increased when a cross section of the press stamp in a direction perpendicular to the direction of movement has an at least partly concave surface. Such surface, which may in an extreme form even be triangular, forces the dough to a centre, instead of spreading it. However, in practice, a flat cross section has shown to be effective already, in particular when the dough part had an earlier processing step, wherein, for instance, the tips of the legs of a croissant were pinched together. For that reason, the device according to the invention may comprise a pair of drivable pinchers, movable with at least a directional component towards each other, arranged upstream in a direction of movement of the dough part with respect to the press stamp, as described in the European Patent EP 2 316 270, which is hereby incorporated by reference.

BRIEF DESCRIPTION OF THE DRAWINGS

The invention will now be elucidated into more detail with reference to the following figures. Herein.

DETAILED DESCRIPTION OF THE PREFERRED EMBODIMENTS

Figure 1:
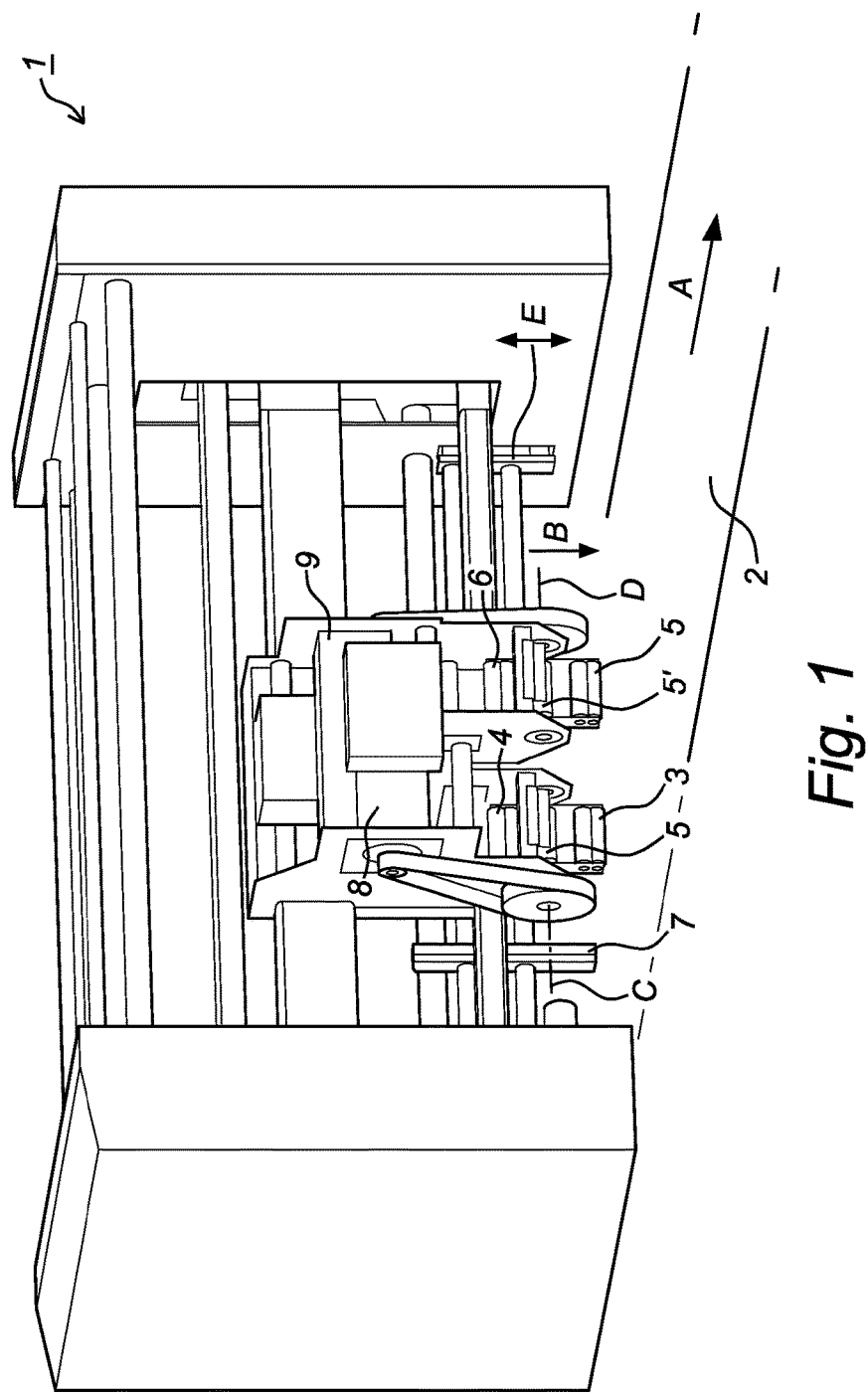
FIG. 1 shows a perspective overview of a device according to the invention.

FIG. 1 shows a perspective overview of a device 1 according to the present invention. The device comprises a conveyor 2, for conveying dough parts (not depicted) in a direction of movement A, a number of press stamps 3, 4, 5, 6, arranged movable with at least a component in a direction B towards a surface of the conveyor for pressing the dough part, which press stamps 3, 4, 5, 6 are further arranged movable with at least a component in the direction of movement A of the dough part. The press stamps 3, 4, 5, 6 are arranged rotary above the conveyor, about axis of rotation C and D. The device further comprises sensors 7 (other sensors not visible in this view) for providing a control signal upon sensing a presence of the dough parts, arranged upstream in the direction of conveyance A with respect to the press stamps 3, 4, 5, 6, and a (non depicted) controller, for driving the press stamps 3, 4, 5, 6 based on the control signal.

As visible in the picture, press stamps 3, 4 and 5, 6 are arranged rotational about the same axis of rotation (C, D respectively). In the embodiment shown, axis C and D do not coincide, still press stamps 5 and 6 are arranged next to press stamps 3 and 4 in a direction perpendicular to the direction of movement of the dough parts. The press stamps next to each other are configured to be nested, by having mutually different orientations of drives 8, 9. The height E of the press stamps 3, 4, 5, 6 above the surface of the conveyor belt 2 is adjustable.

Figure 2A:
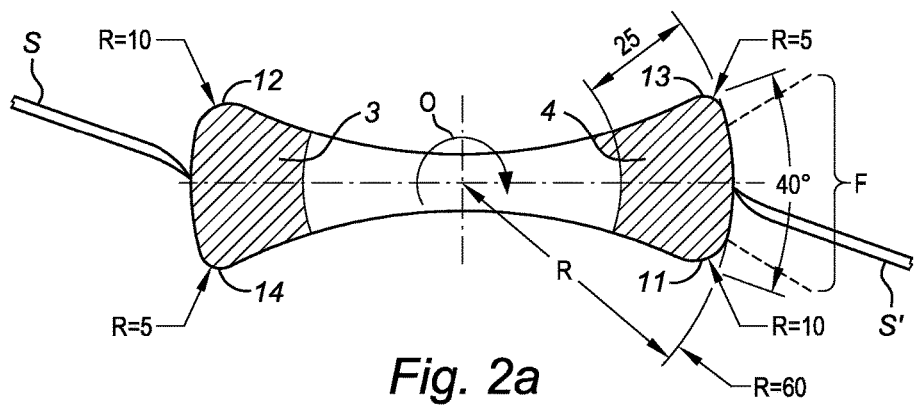
FIGS. 2a-i show a cross sections in the direction of movement of a dough part of embodiments of press stamps according to the present invention.
Figure 2B:
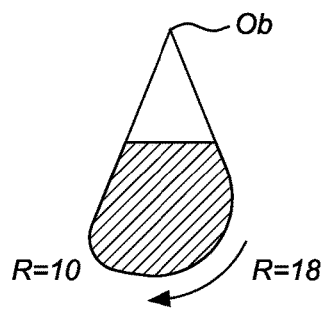
Figure 2C:
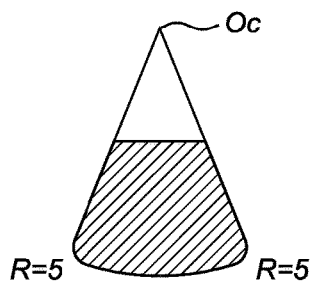
Figure 2D:
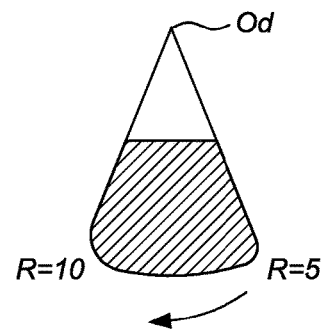
Figure 2E:
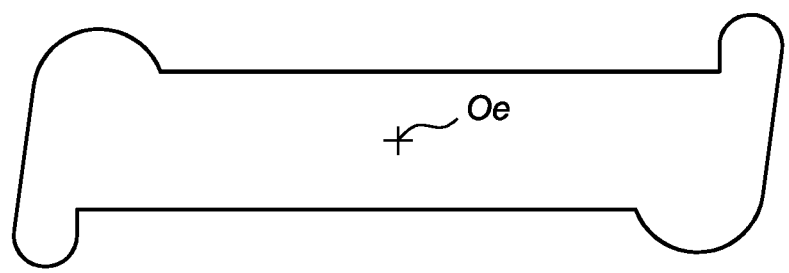
Figure 2F:
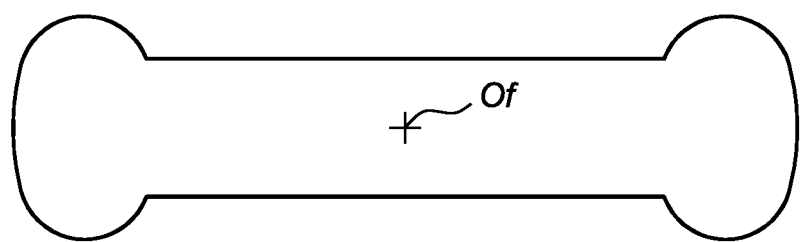
Figure 2G:
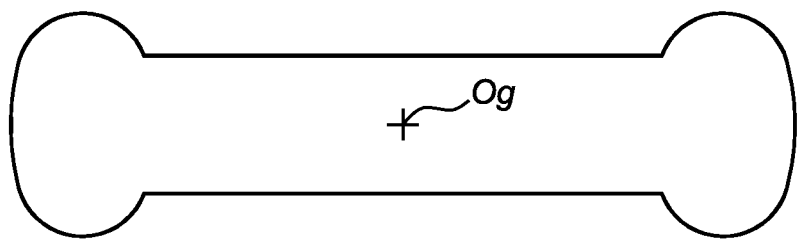
Figure 2H:
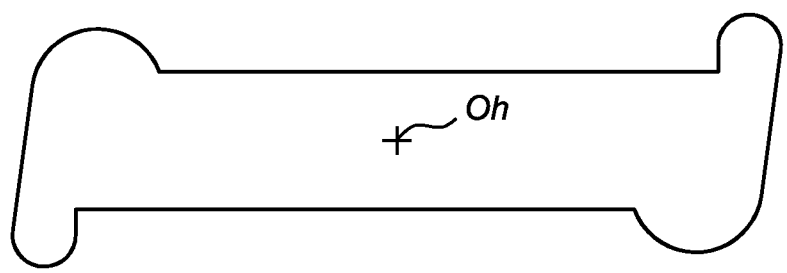
Figure 2I:
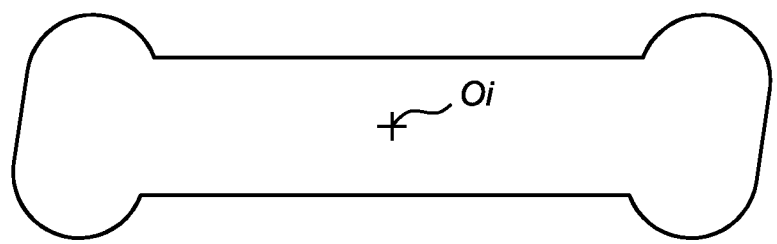

FIG. 2a shows that at least a part F of the contact surface of the press stamps 3, 4 is curved with a radius R corresponding to the distance from its axis of rotation to its surface. In general, the part of the contact surface of the press stamp that is curved with the radius corresponding to the distance from its axis of rotation to the surface extends between 20 and 60 degrees, and in particular between 35 and 50 degrees. The present example shows about 35 degrees. A leading 11, 12 and lagging 13, 14 edge of the press stamp 3, 4 are rounded, with a smaller radius than the distance from its axis of rotation to the surface. The leading edge has a larger radius than the lagging edge. The figure also shows two possible positions of a scraper S and S1, for scraping the press stamp.

Scraper S1 has the advantage that when the orientation of rotation O is applicable, remainings can be caught before they fall onto the conveyor or other dough parts. In case it is not possible to collect these remainings, and it is not considered problematic when the remainings fall on the conveyor, the position of S is chosen.

FIGS. 2b-2i show a variety of alternative possible forms of the cross section of the press stamp in a direction of conveyance. The press stamps are to rotate about their respective axis of rotation Ob-Oi. Embodiments with one or two stamps are shown, but for each of these embodiments goes that multiple stamps per axis are thinkable too.

Figure 3A:
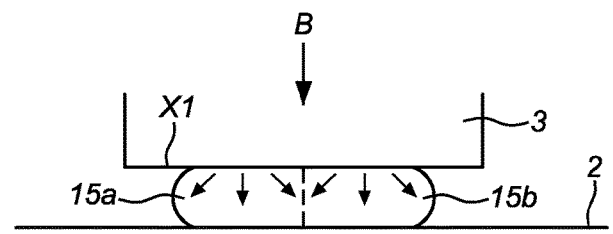
FIG. 3a, b show a cross section perpendicular to the direction of movement of a dough part of different rotatable press stamps according to the invention.

FIG. 3a shows a cross section of press stamp 3 perpendicular to the direction of movement/conveyance of a dough part. The press stamp has an essentially flat cross section X1 of its surface. The tips of the legs of the croissant 15a, 15b that forms the dough part are merged, but also spread a little.

Figure 3B:
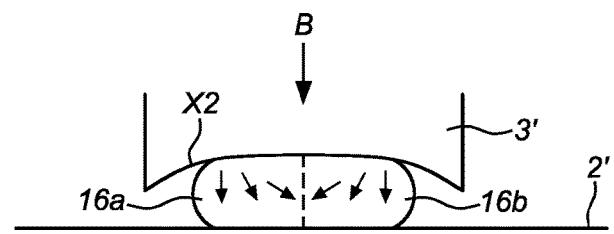

FIG. 3b shows a cross section of alternative press stamp 3' perpendicular to the direction of movement/conveyance of a dough part. The press stamp has an essentially concave cross section X2 of its surface. The tips of the legs of the croissant 16a, 16b that forms the dough part are merged stronger than tips of the legs 15a, 15b from FIG. 3a.

Figure 4:
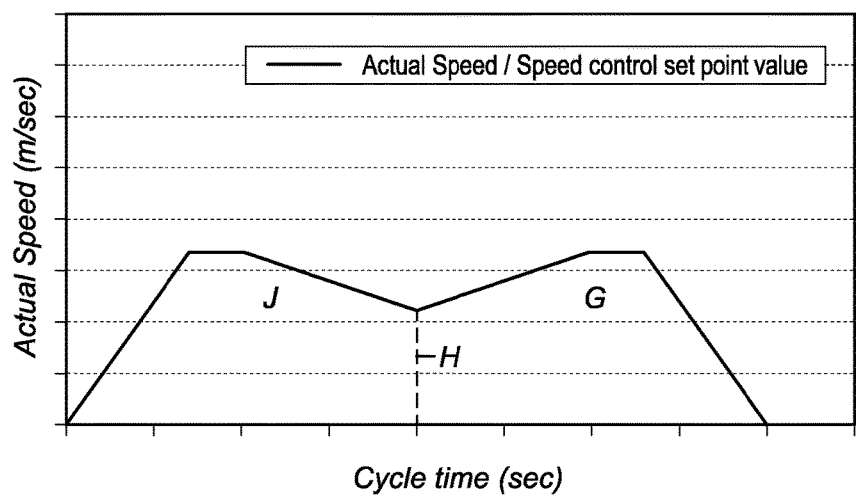
FIG. 4 shows a graph with a control setpoint of the speed of a rotational press stamp according to the present invention.

FIG. 4 shows a graph with a controller set point of the speed of a rotational press stamp, wherein the speed of the press stamp in the direction of movement of the dough part is synchronised with the speed of the conveyed dough part, by increasements before (J) and after (G) its closest position (H) to the conveyor.

The invention claimed is:

1. A device for pressing at least one dough part, comprising:
   a conveyor, for conveying the at least one dough part in a direction of movement;
   at least one press stamp, arranged movable with at least a component in a direction towards a surface of the conveyor for pressing the at least one dough part;
   characterised in that:

the at least one press stamp is further arranged movable with at least a component in the direction of movement of the at least one dough part;

the at least one press stamp is arranged rotary above the conveyor;

at least a part of a contact surface of the at least one press stamp is curved with a radius corresponding to a distance from its axis of rotation to the contact surface; and a leading and a lagging edge of the at least one press stamp are rounded with respect to a direction of rotation of the at least one press stamp, having a smaller radius than the distance from its axis of rotation to the contact surface, wherein the leading edge has a larger radius than the lagging edge.

2. The device according to claim 1, comprising:

a sensor for providing a control signal upon sensing a presence of the at least one dough part, arranged upstream in the direction of movement with respect to the at least one press stamp;

a controller, for driving the at least one press stamp based on the control signal.

3. The device according to claim 2, wherein the controller is configured for synchronising a surface speed of the at least one press stamp in the direction of movement of the at least one dough part with a surface conveyance speed of the at least one dough part, at least during contact of the at least one press stamp with the at least one dough part.

4. The device according to claim 1, wherein the part of the contact surface of the at least one press stamp that is curved with the radius corresponding to the distance from its axis of rotation to the contact surface extends between 20 and 60 degrees.

5. The device according to claim 1, wherein two or more press stamps are arranged rotational about a same axis of rotation.

6. The device according to claim 1, wherein two or more press stamps are arranged next to each other, in a direction perpendicular to the direction of movement of the at least one dough part.

7. The device according to claim 6, wherein the two or more press stamps next to each other are configured to be nested, by having mutually different orientations of drives.

8. The device according to claim 1, wherein a height of the at least one press stamp above the surface of the conveyor belt is adjustable.

9. The device according to claim 1, wherein a cross section of the at least one press stamp in a direction perpendicular to the direction of movement has an at least partly concave surface.

10. The device according to claim 1, comprising a pair of drivable pinchers, movable with at least a directional component towards each other, arranged upstream in the direction of movement of the at least one dough part with respect to the at least one press stamp.

11. The device according to claim 1, comprising a scraper blade, for cleaning a surface of the at least one press stamp.

12. The device according to claim 4, wherein the part of the contact surface of the at least one press stamp that is curved with the radius corresponding to the distance from its axis of rotation to the contact surface extends between 35 and 50 degrees.

13. The device according to claim 4, wherein the part of the contact surface of the at least one press stamp that is curved with the radius corresponding to the distance from its axis of rotation to the contact surface extends between 20 and 60 mm.

14. The device according to claim 13, wherein the part of the contact surface of the at least one press stamp that is curved with the radius corresponding to the distance from its axis of rotation to the contact surface extends between 35 and 50 mm.

* * * * *